Aug. 29, 1961     H. R. BECK ET AL     2,998,018
ELECTRO THERMAL VALVE
Filed July 6, 1959     2 Sheets-Sheet 1
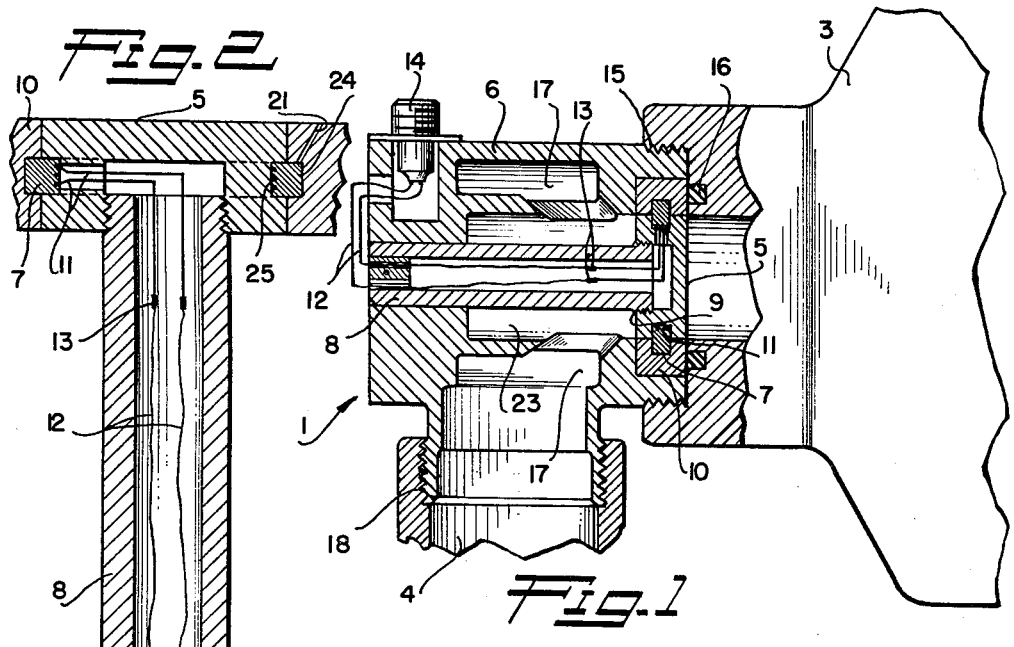
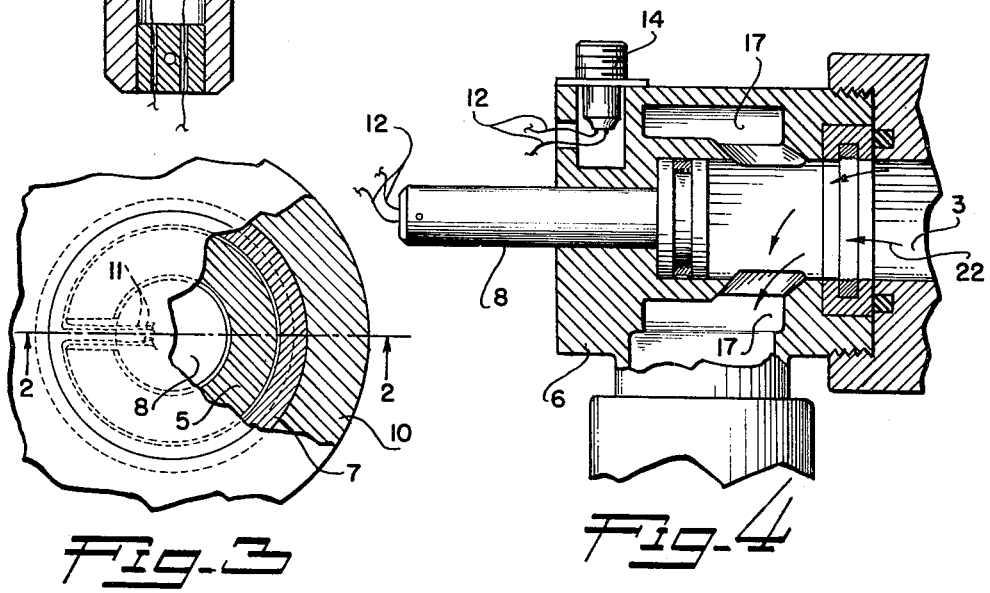
INVENTORS
HAROLD R. BECK
ROBERT S. POPLIN
BY
*George C. Sullivan*
Agent INVENTORS
HAROLD R. BECK
ROBERT S. POPLIN
BY
Agent

United States Patent Office 2,998,018
Patented Aug. 29, 1961

2,998,018
ELECTRO THERMAL VALVE
Harold R. Beck, North Hollywood, and Robert S. Poplin, Sunnyvale, Calif., assignors to Lockheed Aircraft Corporation, Burbank, Calif.
Filed July 6, 1959, Ser. No. 825,109
5 Claims. (Cl. 137—74)

This invention relates to a fast-acting valve and in particular, to a full-throated fast-acting valve which may be opened by thermal and/or electro-thermal means.

In certain applications it is required to open a flow passage in an extremely short time in response to either an electrical signal or a rise in ambient temperature. Such an application arises in connection with the control of flow in lines communicating fire extinguisher storage containers with lines for dispersing the extinguishing fluid. Heretofore, it has been proposed to perform this function by bursting frangible seals in the flow passage or opening of various types of poppet valves. These devices have not been altogether satisfactory because of inherent limitations in their speed of operation and reliability. In such an application, in addition to rapidly opening the flow passage, it is also required that there be substantially zero leakage for long periods of time prior to opening of the flow line. A further requirement is that the device be capable of remote operation by electrical means, responsive to either A.C. or D.C. power. Also, operation must be initiated within a fraction of a second of power application. When using certain types of fire extinguishing fluids, it is particularly important that the fluid be allowed to expand into the dispersing line in an extremely short period of time to produce the desired fire extinguishing qualities. Upon being actuated, the opening of the valve must be full-throated with little or no throttling. Under practical applications, the initiation of valve operation from full open from full closed must be accomplished within milliseconds. Since valves of this type have particular utility in aircraft fire extinguishing systems, they must also be free of undesirable effects which may be caused by extremes of vibration, humidity and temperature.

A valve, according to the present invention, comprises a valve disc which is sealed or seated to the valve body by means of a temperature sensitive material having the proper shear and melting point characteristics. This material is injected or imbedded in a groove, ring or wedge, in either the valve disc or valve body, or both, to carry and resist an applied loaded force in shear. The loaded force may be that of the pressurized fluid in the flow passage. Surrounding or imbedded in the temperature sensitive material is an electrical circuit capable of inducing heat within the seal material to bring it rapidly to the temperature of fusion in order to cause it to fail in shear and release the applied fluid load. In the absence of an applied electrical signal, a rise in ambient temperature, at the valve, to the fusion point of the seal will release the valve disc and release the applied load.

It is, therefore, an object of this invention to provide an improved valve mechanism of the type indicated which is responsive to the application of heat or electrical current and which will provide a full-throated opening within a very short time.

It is a further object of this invention to provide a valve operating mechanism responsive to selected ambient temperatures to open a pressurized line.

Another object of the invention is to provide a high-pressure zero-leakage valve which is free from service deterioration and maintenance requirements.

Still another object of the invention is to provide a novel valve capable of being remotely operated by means of A.C. or D.C. power.

These and other objects of the invention and applications of same having special advantages, will be described in the following specification with reference to the accompanying drawings. It is, however, to be understood that the embodiments of the invention which are described and illustrated are by way of examples only and do not represent all possible embodiments of the invention, and that a departure from the examples illustrated and described therefore does not necessarily involve a departure from the essence of the invention.

In the drawings,

FIGURE 1 is a fragmentary elevation view, partially in section, of one embodiment of the invention showing its use in connection with a bottle of fire extinguishing fluid and a dispersal line for the fluid.

FIGURE 2 is a cross section of the valve disc and plunger taken on a plane passing through the axis of said plunger.

FIGURE 3 is a fragmentary plan view, partially in section, of the valve plunger.

FIGURE 4 is a fragmentary elevation view, partially in section, of the valve of the present invention in the fully opened position.

Figure 5:
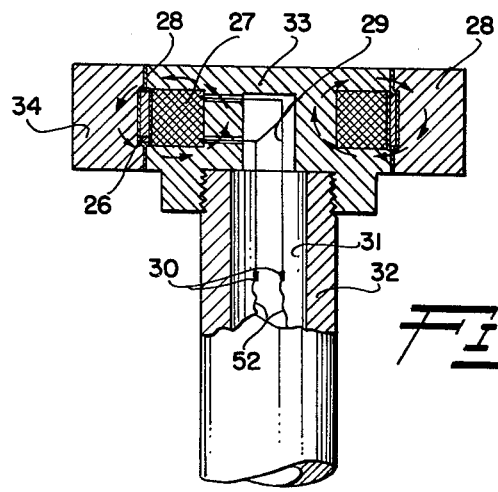
FIGURE 5 is a view of a valve disc and plunger, partially in section, showing an alternative embodiment employing transformer coupling of the electro-thermal elements.

Looking now at FIGURE 1, there is shown an embodiment of the present invention in which the valve 1 is used between a bottle 3, containing a fire extinguishing fluid, and a dispersal line 4. An electro-thermal valve of this invention comprises a valve disc 5 sealed to a valve body 6 by means of a fusible link 7. The valve body 6 is provided with a cylindrical bore 23 which extends from the valve disc 5 to the end of the body 6. Attached to the valve disc 5 is a valve plunger 8 threadably mounted on the valve disc at threaded portion 9. A fusible link 7 of material such as solder or other low temperature alloy is contained within a groove in valve disc 5 and a mating groove in collar 10 opposite the groove in disc 5. The fusible link 7 in a solid state thus firmly secures the valve disc 5 to the collar 10 and the valve body 6.

The fusible link also has a heat-producing element for generating heat to cause the fusion of the seal, the said heating element being connected in circuit with a suitable electrical power source for heating and fusing the fusible link. Imbedded within the fusible link 7 are resistance wires 11 which comprise an electrical heating element. Resistance wires 11 are suitably attached to a pair of power input leads 12 at connection 13. The power input leads 12 terminate at an electrical connector 14 to which may be attached a source of A.C. or D.C. electrical power.

The valve body 6 is attached to the bottle 3, containing the fire extinguishing fluid under pressure, by means of a threaded coupling 15 or other suitable means. An O-ring seal 16 maintains the pressure-tight integrity of the coupling between the bottle 3 and the valve 1. The cylindrical bore 23 or discharge side of the valve communicates with ports 17 through which the fluid may pass to the dispersal line 4. The valve body 6 is connected to the dispersal line 4 by a threaded coupling 18 or other suitable means.

The application of electric power to resistance wires 11 via leads 12 and connector 14 will result in heating of link 7 thereby causing the seal to fail under the force of the pressurized fluid in bottle 3. The valve plunger 8 will be moved by the expanding fluid to a new position as shown in FIGURE 4. This action results in the opening of the full-throated passage through ports 17 permitting the fluid to flow in the direction shown by arrows 22. The displacement of the valve plunger 8 may cause leads 12 to part and thereby open the electrical circuit so that it will not thereafter draw current.

The valve may be similarly opened by the existence of a high ambient temperature such as would occur in the event of an accidental fire. That is, the heat conducted through the valve body 6 and collar 10 would cause link 7 to fuse and release the valve disc 5 and plunger 8. The fire extinguishing fluid in bottle 3 would then be released into dispersal passage 4 for controlling or extinguishing the fire.

Looking now at FIGURE 2 there is shown a cross section of the seal comprising the valve disc 5 and valve plunger 8 taken on line 2—2 of FIGURE 3. The valve disc 5 is sealed and/or seated by means of the annular ring of thermo-sensitive alloy comprising fusible link 7. The alloy may be injected into the annular void defined by mating grooves 24 and 25 of the valve disc 5 and collar 10, holding the valve disc 5 in shear, through opening 21, during fabrication of the device. The collar 10 is provided to facilitate fabrication of the device and to provide the proper conduction properties. It should be understood, however, that groove 24 may be located in body 6 and collar 10 dispensed with altogether.

The release or opening of the valve is initiated by the generation of fusing heat at or inside the valve sealing ring or link to produce valve opening with little, if any, thermal delay or failure. The pressurized fluid acting on the valve disc serves to propel the valve disc 5 and plunger 8 along the axis of the cylindrical bore 23 to a position as shown in FIGURE 4. The full-throated opening, as shown in FIGURE 4, occurs substantially instantaneously when the fusible link shears, permitting the valve disc 5 and plunger 8 to be forced by liquid or gas pressure well down-stream for a wide opening of the valve with a minimum of throttle. The time for full opening is measured in milliseconds since the valve disc and plunger is entirely free to move upon shearing of the fusible link, there being no springs to overcome or mechanical linkages to offer inertial resistance to rapid valve opening.

There is shown in FIGURE 5 an alternative embodiment of the invention which may be remotely actuated by means of A.C. power. In this instance the fusible link comprises a temperature sensitive alloy formed into a ring 26. Ring 26 serves as a secondary winding, comprising a single turn, of a transformer. Winding 27 serves as a primary of the transformer and will induce a current in ring 26 which forms a shorted turn, and will thereby generate a high current in ring 26. Electromagnetic coupling, alternating on each A.C. cycle, along a path shown by arrows 28 will induce this current in the shorted turn secondary.

Alternating current power is supplied to the primary transformer winding 27 through a pair of wires 29 which are connected to the input power leads at connection 30. The electrical leads 52 pass through the hollow center 31 of valve plunger 32.

The fusible ring 26 is insulated from the valve disc 33 and the collar 34 by means of sealant material 28 which provides a fluid-tight seal, but will not conduct electricity. Heat generated in ring 26 will cause the alloy to reach the fusing temperature and cause the seal to fail in shear and release the valve disc 33 and plunger 32 from collar 34. The high current passing through the low resistance of the shorted turn will cause rapid heating and the resulting fusing of the link 26. This action will cause the seal to fail in shear and release the valve disc and plunger from the collar 34 under the pressure of the fluid acting on the valve disc. An advantage of this particular embodiment is that the leads 52 communicating power to the device need not carry large amounts of current since the transformer action with the device will convert relatively high-voltage low-current input power from a remote energiing source to relatively high-current low-voltage power within the link 26 as is required for rapid heating.

Figure 6:
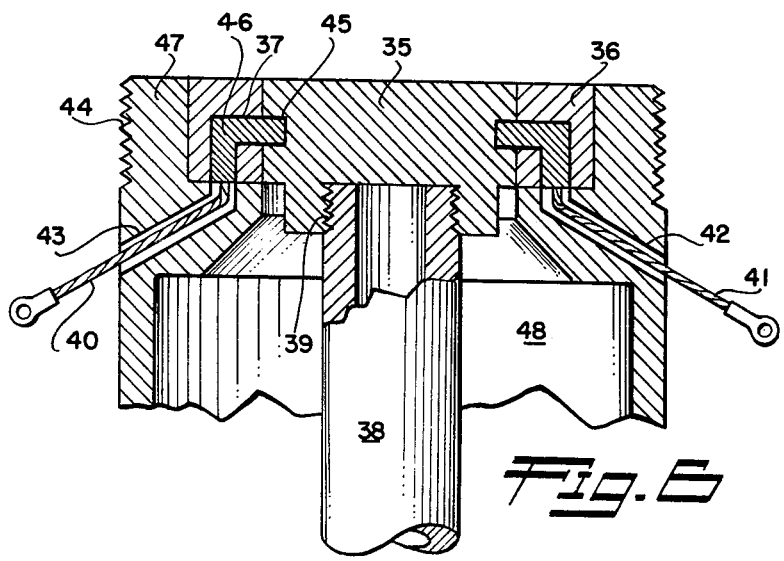
FIGURE 6 is a fragmentary elevation view of a valve disc and plunger, partially in section, showing an alternative embodiment of the fusible link of the valve mechanism employing direct electrical heating.

There is shown in FIGURE 6 still another embodiment of the invention in which either an A.C. or D.C. electric current may be applied directly through suitable electrodes into the alloy seal itself wherein its electrical resistance is such that the flow of current through the alloy will generate sufficient heat in the required time to melt the alloy and cause it to fail in shear. The valve disc 35 is sealed to collar 36 by means of a fusible link 37 comprising a low melting point alloy having relatively high electrical resistance and which is formed in the opening 46 of collar 36 and mating annular opening 45 in disc 35. A valve plunger 38 is threadably attached as shown at 39 to the valve disc 35. The disc 35 and collar 36 have a high electrical resistance relative to the electrical resistance of the fusible link 37 in order to contain the current flow within the fusible link 37. Low resistance electric power leads 40 and 41 are used to carry current into the link 37. These leads pass through insulated passages 42 and 43 spaced approximately 180° apart. Collar 36 is supported by valve body 47 which may be attached to a fluid bottle by means of threaded portion 44. Upon being connected to a suitable electrical power source the wires 40 and 41 will conduct sufficient current to the fusible link 37 to cause it to heat to the fusing point causing the seal between the valve disc 35 and collar 36 to fail in shear. The valve disc 35 and the plunger 38, attached thereto by means of threaded area 39, may then be moved to open the passageway 48 in the valve body, in a manner similar to that described in a previous embodiment. It should be understood that the valve body is coupled into a fluid pressure line in some convenient manner.

The valve disc itself is, then, sealed and/or seated by means of the annular ring of thermally responsive alloy injected into the grooves of the plunger and the encircling ring, holding the valve in shear. The release action of the valve is instantaneously initiated by the generation of fusing heat directly inside the valve sealing ring to produce valve opening with little thermal delay.

It should be understood that the embodiments discussed heretofore have employed the energy of the pressurized fluid acting on the valve disc to move the valve plunger upon release of the valve disc. However, it will be obvious to those skilled in the art that a spring mechanism or other energy storing element may be employed to move the valve disc and plunger upon being released by the fused or melted link. Also, in the above embodiments, the groove, ring or wedge of low temperature alloy is placed between adjacent surfaces, one of which is fixed and one of which is relatively movable. The grooves may be of circular arrangement, as described, or may have other suitable configurations to both contain the alloy and support the load to be released. The fusible alloy or sealant material for a particular application is chosen in accordance with the temperature of fusion of the material and the desired operating temperature of the device. Therefore, the specific embodiments of the device which have been described should not be construed as being limiting and it will be understood that within the scope of this invention various changes may be made in the form, details, proportion and arrangements of the parts, the combination and mode of operation which generally stated consist in a device capable of carrying out the objects set forth, as disclosed, and defined in the appended claims.

What is claimed is:

1. In an electro-thermal device comprising an enclosing body having an aperture in one wall, a disc retained in said aperture in said body, a first annular groove in said body located opposite a second annular groove in said disc, a fusible material in and between said first and second grooves for retaining said disc in said aperture, and an electrical circuit means having a portion thereof embedded in said fusible material and including a selectively operated short circuit means for heating and fusing said fusible material for releasing said disc from said aperture.

2. An electro-thermal valve comprising a valve body having annular passage extending therethrough to conduct a flow of fluid, a valve disc disposed within such body passage to block said flow of fluid, fusible sealant material for sealing said disc in said body, and electrical heating means having a plurality of windings embedded in said sealant material and including a selectively operated short circuit means for fusing said sealant material and freeing said disc from said body to open said passage to the flow of fluid.

3. A thermally responsive device for controlling the discharge of a pressurized fluid through a passage comprising a valve located in said passage to normally close said passage, a first depression in the wall of said passage and located opposite said valve when in the closed position, a second depression in said valve opposite said first depression in said passage, a fusible material located in said first and second depressions to normally hold said valve in a fixed position within said passage in closed relationship against the pressure of said fluid, and electrical circuitry having a portion thereof embedded in said fusible material and including a selectively operated short circuit means for fusing said fusible material thereby permitting said valve to move within said passage out of its fixed position under the effect of said pressurized fluid to open said passage.

4. A thermally responsive valve comprising a valve body having an inlet passage and a discharge passage, a plurality of ports communicating said inlet passage with said discharge passage, a valve plunger intermediate said inlet passage and said discharge passage for sealing said ports from said inlet passage, said valve plunger being slidably mounted for movement under the influence of a pressurized fluid in said inlet passage, and a temperature-sensitive sealant disposed between said valve plunger and said valve body for normally sealing and retaining said valve plunger in said intermediate position, said sealant being altered upon an increase in temperature to release said valve plunger from said valve body permitting direct communication between said inlet passage and said discharge passage via said ports, electrical circuit means having a portion thereof within said sealant including a selectively operable short circuit means for selectively increasing said sealant temperature, and detachable connector means included in the electrical circuit means for opening the electrical circuit means responsive to a predetermined plunger movement.

5. A thermally responsive valve comprising, a valve body having an inlet passage and a discharge passage, a plurality of ports communicating said inlet passage with said discharge passage, a valve plunger intermediate said inlet passage and said discharge passage for sealing said ports from said inlet passage, said valve plunger being slidably mounted for movement under the influence of a pressurized fluid in said inlet passage, a first transformer winding, a second transformer winding composed of a fusible alloy connecting said valve plunger to said valve body for normally sealing said valve plunger in said intermediate position, insulating material disposed between said second transformer winding and said valve body, said second transformer winding being altered upon an increase in temperature to release said valve plunger permitting direct communication between said inlet passage and said discharge passage via said ports, and electrical conductor means attached to the first transformer winding for supplying power thereto.

References Cited in the file of this patent
UNITED STATES PATENTS

| | | |
|---|---|---|
| 166,451 | Brown | Aug. 10, 1875 |
| 900,763 | McNutt | Oct. 13, 1908 |
| 1,292,603 | Hohman | Jan. 28, 1919 |
| 1,734,186 | Weidmann | Nov. 5, 1929 |
| 1,834,645 | Ryan | Dec. 1, 1931 |
| 2,360,733 | Smith | Oct. 17, 1944 |

FOREIGN PATENTS

| | | |
|---|---|---|
| 782,559 | Great Britain | Sept. 11, 1957 |